United States Patent
Christensen et al.

[15] 3,697,011
[45] Oct. 10, 1972

[54] FISHING REEL

[72] Inventors: Jay Arthur Christensen, Bloomington, Minn.; Theron Frank Compton, 571 Oak Street, Hugo, Minn. 55038

[73] Assignee: said Compton, by said Christensen

[22] Filed: Feb. 6, 1969

[21] Appl. No.: 797,088

[52] U.S. Cl. ......242/84.1 A, 242/84.1 J, 242/84.2 A
[51] Int. Cl. .............................................. A01k 89/00
[58] Field of Search...242/84.1, 84.1 A, 84.2, 84.2 A, 242/84.21 A, 84.5, 85.5 A, 85.51 A, 84.1 J; 43/21

[56] References Cited

UNITED STATES PATENTS

| | | | |
|---|---|---|---|
| 2,911,165 | 11/1959 | Sarah | 242/84.2 |
| 2,989,266 | 6/1961 | Yeada | 242/84.2 |
| 3,028,115 | 4/1962 | Hammer | 242/84.2 |
| 3,120,357 | 2/1964 | Wood, Jr. | 242/84.21 X |
| 3,123,319 | 3/1964 | Hull | 242/84.51 |
| 3,195,829 | 7/1965 | Balaguer | 242/84.2 |
| 3,223,346 | 12/1965 | Fowler | 242/84.2 |
| 3,248,819 | 5/1966 | Stealy | 242/84.1 X |
| 3,284,018 | 11/1966 | Wood | 242/84.2 |
| 3,348,788 | 10/1967 | Vinokur | 242/84.21 |

FOREIGN PATENTS OR APPLICATIONS

| | | | |
|---|---|---|---|
| 36/8,033 | 6/1961 | Japan | 242/84.1 A |

Primary Examiner—Billy S. Taylor
Attorney—Gunnar A. Gustafson, Jr.

[57] ABSTRACT

A spinning reel is provided with both manual crank operating means and battery operated motor means interconnected through a gear train to operate a pickup rotor assembly. A plurality of one-way roller clutches are provided such that (1) when either the manual operating means or the motor operating means is functioning to retrieve the line the other will be disengaged from the gear train, and (2) both the manual operating means and the motor operating means as well as the gear train will be prevented from operation when the line is provided with drag as when a fish has been hooked.

3 Claims, 6 Drawing Figures

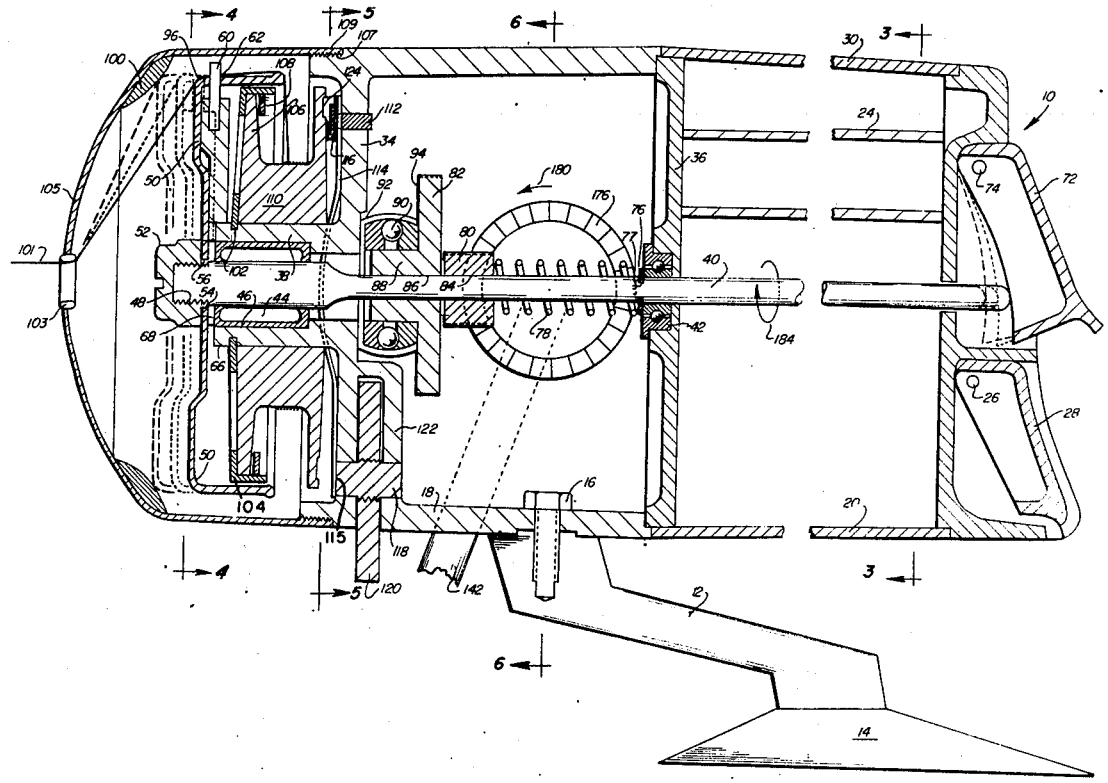

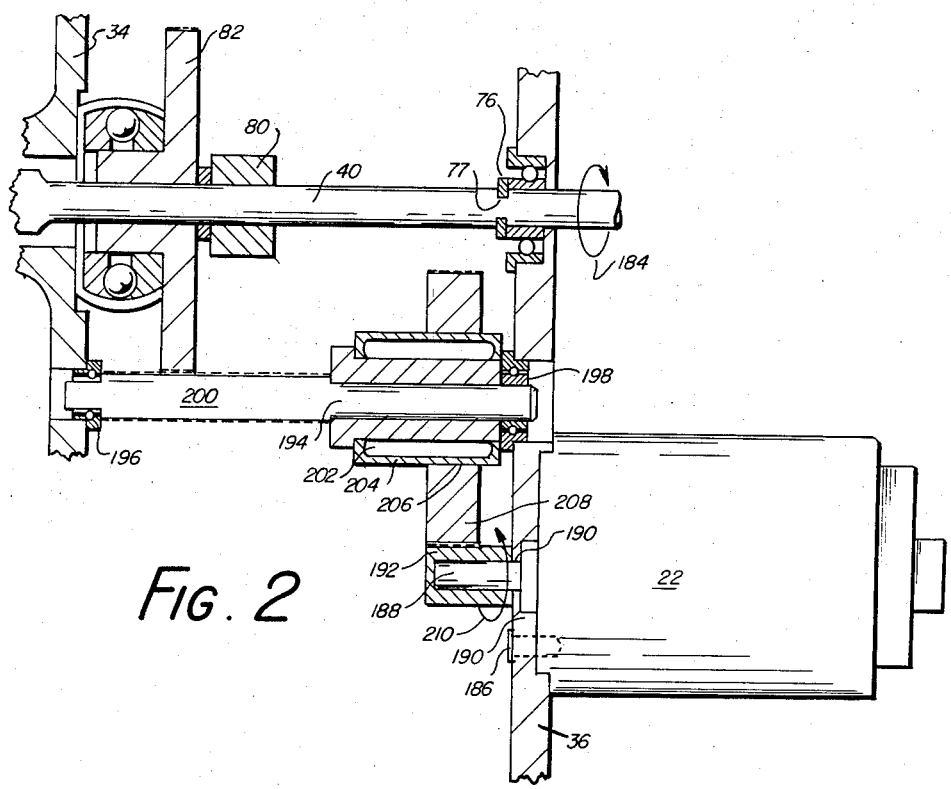
Fig. 2
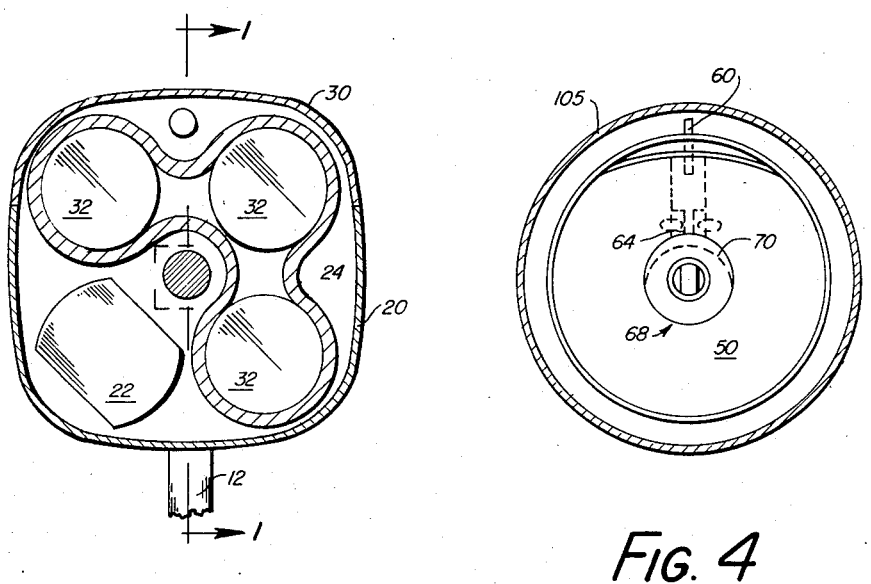
Fig. 3
Fig. 4
INVENTORS
THERON F. COMPTON
JAY A. CHRISTENSEN
THEIR ATTORNEY

INVENTORS
THERON F. COMPTON
JAY A. CHRISTENSEN
BY
THEIR ATTORNEY

FISHING REEL

This invention relates to fishing reels particularly of the type incorporating a battery operated motor for retrieving the line.

More particularly, this invention relates to such a fishing reel incorporating both a motor operating means and a manual operating means for retrieving the line and in which either of the operating means may be used independently of the other.

One object of the invention is to provide such a fishing reel in which the gear train is relieved of stress when the line has drag placed thereon as when a fish is hooked or when an obstruction such as a log or the like (commonly referred to as a deadhead) is hooked.

Still another object of the invention is to provide such a fishing reel in which the overall dimensions and weight are minimized.

Figure 1:
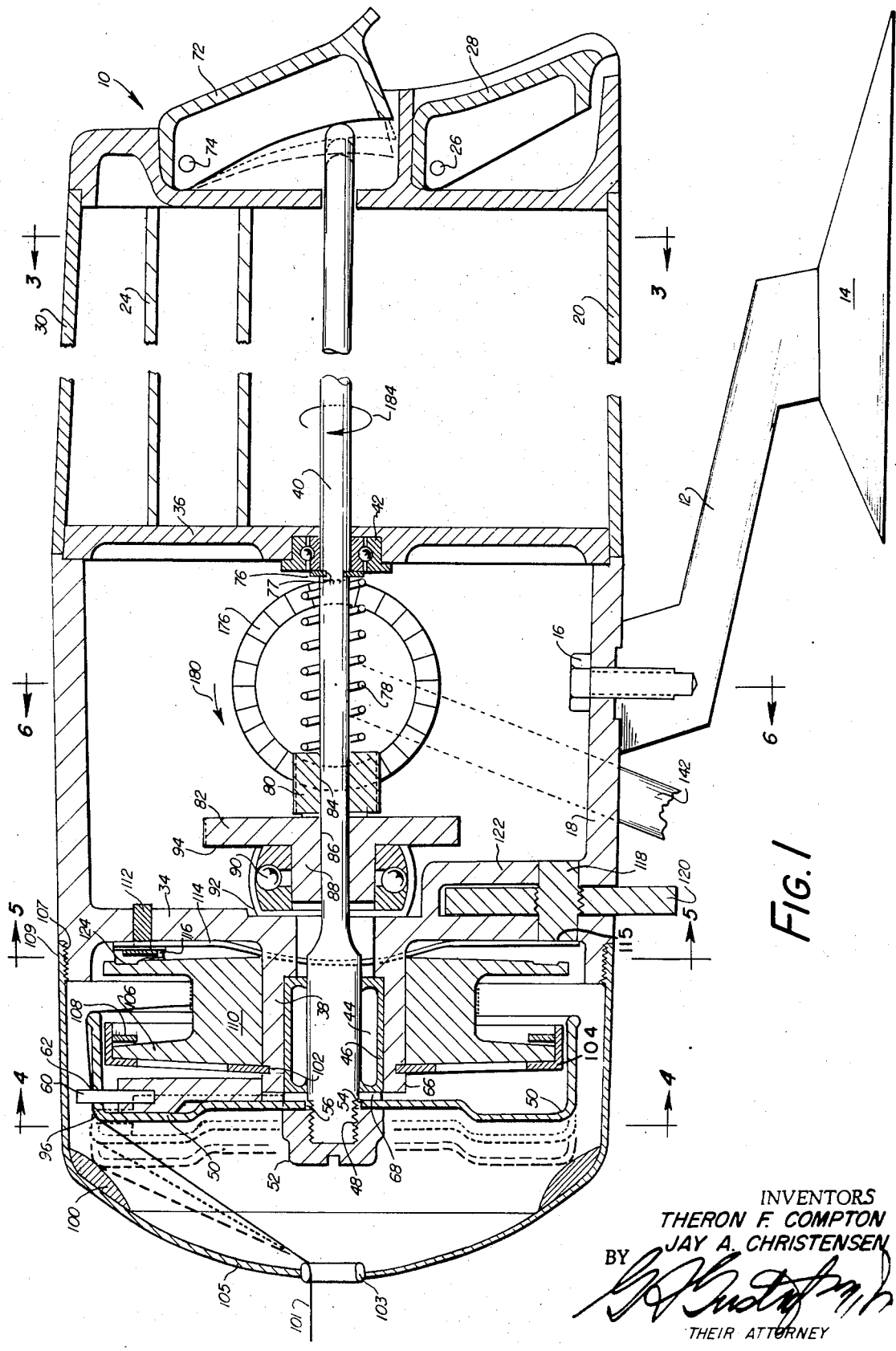
Figure 5:
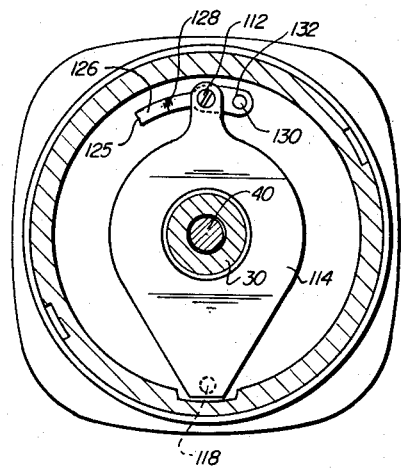
Figure 6:
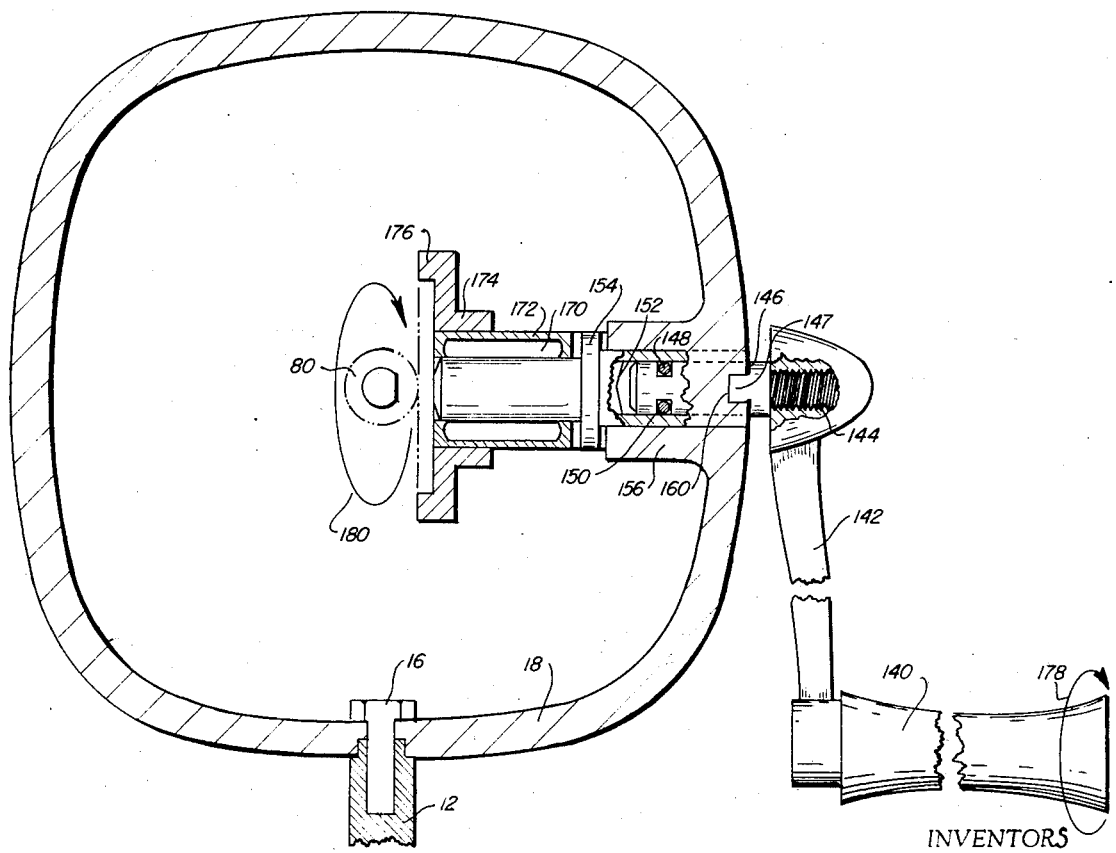

These and other objects of the invention will be apparent from the following specification and drawings in which:

FIG. 1 is an enlarged sectional view taken generally through the vertical mid-plane of the device, along line 1—1 of FIG. 3, FIG. 2 is a view showing the motor operated gear train, FIG. 3 is a reduced cross-section taken generally along the line 3—3 of FIG. 1, FIG. 4 is a reduced cross-section taken generally along the line 4—4 of FIG. 1, FIG. 5 is a reduced cross-section taken generally along the line 5—5 of FIG. 1, and FIG. 6 is a cross-section taken generally along the line 6—6 of FIG. 1.

As shown in FIG. 1, the fishing reel generally indicated by the numeral 10 has a pedestal 12 and a foot 14 secured by the bolt 16 to the main casing midsection 18. The pedestal 12 and the foot 14 are adapted to be secured to a fishing rod in any one of several conventional ways.

The central housing 18 has secured thereto a rearward housing 20 which houses the motor 22 (see FIG. 2) and a three-battery battery pack 24. At the rearward end of the housing 20 is pivoted at 26 the motor control button 28. When the button 28 is depressed from its position shown in FIG. 1, it closes a switch (not shown) to place the batteries in series with the motor to operate the same. Since series wiring of batteries to a motor is well-known, the wiring and the switch for the motor are not shown in the drawings. The rearward housing 20 has a removable top 30 through which the battery pack 24 may be removed. As shown in FIG. 3 the battery case 24 has within it three batteries 32 which are removable vertically (as viewed in FIG. 3) upwardly when the top 30 of the case segment 20 has been removed, thus permitting replacement of an entire battery pack while a spare battery pack is being recharged if desired.

The central casing portion 18 included a forward wall 34 and the interior of such central casing 18 is separated from the rearward casing 20 by a partition 36. The forward wall 34 of the central casing section 18 has a forwardly projecting tubular support boss 38. The main drive shaft 40 is journalled in the rearward partition 36 by means of a ball bearing 42. At its forward end the main drive shaft 40 is supported in the tubular boss 38 by means of a one-way roller clutch 44. The outer race 46 of the roller clutch 44 is fixed in place within the supporting boss 38. The drive shaft 40 is thus supported by the ball bearing 42 and the one-way roller brake 44 in such manner as to permit longitudinal movement along its axis and the rotational movement about said axis; however, the roller brake 44 restricts the rotary movement to one direction only (clockwise as viewed from the rear of the device) all as more fully disclosed hereinafter. The forward end of the drive shaft 40 is reduced and threaded as shown at 48 thus providing a shoulder 54. A pick-up rotor 50 having an opening 56 therein bears against said shoulder 54 and is held in fixed relation to said shaft 40 by means of a nut 52.

A line pick-up pin 60 is supported on and within the rotor 50 and projects from the outer surface of the rotor through an opening 62 therein. The pin 60 is supported by the rotor 50 for radial movement with respect thereto from the solid line position shown in FIG. 1 to the dotted line position shown in FIG. 1. When in the solid line position shown in FIG. 1, the lower end 64 of the pin 60 bears against the outer surface 66 of the supporting boss 38.

The forward face 68 of the supporting boss 38 has a cam 70 machined thereon which operates within one revolution of the rotor to move the pin 60 from its dotted line position in FIG. 1 to its solid line position. The operation of the pin 60 with respect to the rotor 50 by means of the cam 70 is conventional.

The longitudinal movement of the shaft 40 from its solid line position as shown in FIG. 1 to its dotted line position is provided by the control button 72 pivoted at 74 to the rearward face of the rearward casing section 20. The drive shaft 40 has a retaining ring 76 secured in a suitable groove 77 therein adjacent the forward face of the ball bearing 42. This retaining ring limits the rearward movement (to the right in FIG. 1) of the drive shaft 40 under the urging of the coil spring 78. The spring 78 is compressed between the retaining ring 76 and the gear 80 which gear is supported on the main drive shaft 40. Also supported upon the main drive shaft 40 is gear 82. The openings 84 and 86 in the gears 80 and 82 respectively are not entirely round but have a flat portion mating with a similar flat portion (not shown) on the shaft 40. In this way the shaft 40 may move longitudinally of its axis with respect to the gears 80 and 82; however, rotation of either of the gears 80 or 82 will impart rotational movement to the shaft 40. At its forward end the gear 82 has a hub 88 which supports a thrust ball bearing 90. At its forward face the thrust ball bearing 90 engages the rearward face 92 of the wall 34. At its rearward face the thrust bearing 90 engages the forward face 94 of the gear 82.

It will be seen that the spring 78 being compressed between the gear 80 and the retaining ring 76 urges the gears 80 and 82 as well as the thrust bearing 90 forward against the wall 34 and at the same time urges the retaining ring 76 and the main drive shaft 40 rearwardly against the front face of the ball bearing 42, all as shown in solid lines in FIG. 1. Upon depression of the button 72 the main drive shaft 40 will be urged forwardly against the spring 78 into its dotted line position as shown in FIG. 1 and carrying with it the rotor 50 and the line pick-up pin 60. Further depression of the button 72 moves the main driveshaft 40 to the dashed line position shown in FIG. 1 in which the outer corner 96 of the rotor 50 bears against the elastomeric brake 100.

The line brake 100 comprises an elastomeric ring or doughnut adhesively secured to the inner surface of the front cover or nose piece 105 in a position to be contacted by the forward corner 96 of the line rotor 50 when the line control button 72 is fully depressed to the dashed line position shown in FIG. 1. The nose piece 105 is secured to the casing 18 just forward of the forward wall 34 by any conventional suitable means such as cooperating threads 107, 109. The nose piece 105 has an opening in the forward face thereof lined with a suitable line guide 103 through which the fishing line 101 passes.

Supported upon the outer surface 66 of the supporting boss 38 is a line spool 110. The spool 110 may rotate about the supporting boss 38 but is held against totally free rotation thereabout by means of a spring-type drag mechanism described hereinafter. A retaining ring 102 retains the spool 110 on the boss 38. A line retainer 104 is secured to the forward flange 106 of the spool 110 by means of projections 108 on the retainer 104 is made of a somewhat resilient material such as molded nylon. The line retainer 104 may, therefore, be merely snapped onto the spool 110 over the forward flange 106.

At its forward face the wall 34 has secured thereto by the screw 112 a drag spring 114. As shown in FIG. 1, the spring 114 is curved to bear against the rearward surface 116 of the spool 110. At its lower end the spring 114 has secured thereto at 115 a threaded screw 118 which passes rearwardly through the wall 34 and through a rearward supplementary supporting wall 122 in loose fitting slideable relationship to both said walls. Threaded about the screw 118 is a knurled nut 120 which may be adjusted from outside the casing by the user to increase or decrease the pressure of the spring 114 against the spool face 116 of the spool 110. In this way a suitable drag may be provided for the spool 110. The curve in the spring 114 is such that even when the spring 114 is adjusted by the nut 120 to its minimum drag the spool 110 is held against rotation sufficiently to permit the line to be stripped therefrom during casting without rotating the spool 110. Drag spring 114 is also shown in FIG. 5.

The rearward face 116 of the spool 110 has a plurality of closely spaced indentations or serrations 124 arranged in a circle adjacent the periphery of the spool. These serrations 124 are engaged by the end 125 of a spring-like clicking mechanism 126 best shown in FIG. 5. The end 125 projects rearwardly toward the serrations 124 due to a bend 128 in the spring-like clicker 126. The spring or clicker 126 is secured to the forward wall 34 by means of the screw 112 which passes first through the drag spring 114 and then through a suitable opening in the spring-like clicker mechanism 126. A boss 130 on the wall 34 extends forwardly and passes through an opening 132 in the clicker mechanism 126 and together with screw 112 secures the same in place against any accidental rotational movement of the clicker mechanism 126 about screw 112.

The drive shaft 40 and the line rotor 50 may be rotated manually to pick up the line by means of handle 140. As shown in FIG. 6 the handle 140 is journaled to a crank 142 threaded at 144 to a shaft 146. The shaft 146 has an annular groove 148 therein which receives a frictional rubber "O" ring 150 which retains the handle and crank mechanism 140–150 within a central bore 152 in a stub shaft 154 journaled in a boss 156 formed in the central casing portion 18. It will be seen that the shaft 146 has two laterally projecting ears 147 which are engaged in cooperating notches 160 in the end of the stub shaft 154. It will be seen therefore that the crank and crank handle 140–150 may merely be pushed into and pulled out of the bore 152 in the stub shaft 154 by aligning the ears 147 on the handle shaft 146 with the cooperating notches 160 in the stub shaft 154. The frictional O-ring 150 will prevent accidental removal of the manual crank handle 140–150.

At its inner end the stub shaft 154 supports a one-way roller clutch 170 which has its outer race 172 secured within the hub 174 of the gear 176. The roller clutch 170 is so designed that it will cause rotation of the gear 176 only when the crank 142 is rotated in the direction shown by the arrow 178 in FIG. 6. This rotation will cause rotation of the gear 176 in the direction of the arrow 180. If the crank 142 is rotated in the opposite direction (counter clockwise as viewed from the right in FIG. 6) the one-way roller clutch 170 permits the shaft 154 to rotate freely with respect to the gear 176 imparting no motion to the gear 176. As shown in FIG. 1 proper rotation of the crank 142 in the direction of the arrow 178 will cause rotation of the gear 176 in the direction of the arrow 180 shown in FIG. 1 and by virtue of the engagement of the teeth of gear 176 with the teeth of gear 80 the gear 80 and the shaft 40 will be rotated in the direction of the arrow 184 shown in FIG. 1.

The main drive shaft 40 and the rotor 50 may also be operated electrically by the battery operated motor 22. As shown in FIG. 2 the motor 22 is supported from the partition 36 by suitable securing means such as the screws 186. The shaft 188 of the motor 22 extends forwardly through the opening 190 in the wall 36 and has secured thereto the gear 192. A stub shaft 194 is supported for rotation in the forward wall 34 and the rearward partition 36 by means of suitable roller bearings 196 and 198. The stub shaft 194 has secured thereto the gear 200. Also supported by the shaft 194 is a one-way clutch 202 which has its outer race 204 secured within the central bore 206 of a gear 208. The gears 208 and 192 have their teeth in mutual engagement. The gear 200 has its teeth in engagement with the teeth of gear 82 on the main drive shaft 40. It will be seen that upon operation of the motor its shaft 188 and the gear 192 supported thereon will be driven in the direction of the arrow 210 and will in turn drive the gear 208 which will engage the clutch 202 to rotate the shaft 194 and a gear 200 thereon. The gear 200 will of course rotate the gear 82 and shaft 40 in the direction of the arrow 184 shown in FIGS. 1 and 2.

OPERATION

CASTING

During the casting portion of the operation of the reel the line control button 72 is fully depressed moving the main drive shaft 40 of the reel forwardly to its dashed line position in FIG. 1 carrying with it the rotor 50 which pinches the line 101 between the line brake 100 and the forward corner 96 of the rotor at whatever position about the rotor the line may happen to be. The fisherman then makes his backstroke. Upon moving the rod forwardly for the actual cast the fisherman releases the line control button 72 which permits the spring 78 to urge the main drive shaft 40 rearwardly carrying with it the rotor 50 into the dotted line position shown in FIG. 1 thus releasing the line 101 from its pinched condition between the brake 100 and the forward corner 96 of the rotor 50. It will be noted that the spring 78 cannot move the main drive shaft 40 and the rotor 50 rearwardly to the full line position since the bottom end 64 of the line pin 60 will be retracted below the outer surface 66 of the supporting boss 38 and thus will bear against the front face 68 and the cam 70 thereon to prevent further rearward movement. The line 101 will then be stripped from the spool 110 in conventional fashion.

RETRIEVAL (ELECTRICALLY)

When the fisherman desires to retrieve the lure and line 101 he uses his thumb to depress the motor control button 28 which actuates an electrical switch (not shown) to activate the motor 22. As shown in FIG. 2 the motor 22 operates in the direction of the arrow 210 to rotate the gear 192 in the same direction. The one-way clutch 202 will be engaged to rotate the shaft 194 in the direction the same as gear 208 and opposite to the direction of the motor. The gear 200 on the shaft 194 being in engagement with the gear 82 will operate to rotate shaft 40 in the direction of the arrow 184. Rotation of the main drive shaft 40 in the direction of the arrow 184 will cause the rotor 50, fixed thereto, to rotate in the same direction. This rotation will cause the lower end 64 of the line pick up pin 60 to ride upon the cam 70 and within one revolution will cause the line pick up pin 60 to extend through the opening 62 and outwardly of the surface of the rotor 50. In this extended position of the pin 60, the bottom, 64 thereof will be raised to the surface 66 of the boss 38 thus permitting the spring 78 to move the shaft 40 and the rotor 50 rearwardly to its solid line position shown in FIG. 1. In this extended position the pin 60 will strike the line 101 and wind the same about the spool 110 thus retrieving the line.

It will be seen that since the gear 80 is supported by the main drive shaft 40 in non-rotating relationship thereto that the gear 80 will be similarly driven in the direction of the arrow 184 and will thus cause the gear 176 to be driven in the direction of the arrow 180. However, because of the one-way clutch 170 the movement of the gear 176 will not be imparted to the shaft 154 since the one-way roller clutch 170 will cause the gear 176 to simply roll around the shaft 154. Accordingly, the manual crank 142 will not rotate when the motor is operating to retrieve the line.

RETRIEVAL (MANUALLY)

When it is desired by the fisherman to retrieve the line manually rather than by the motor it is simply necessary that he grasp the handle 140 and turn the crank 142 in the direction of the arrow 178. This rotation will be imparted through the ears 147 and the notches 160 to the shaft 154, the one-way roller clutch 170 will engage to rotate the gear 176 in the direction of the arrow 180 in FIGS. 1 and 6. This rotation of the gear 176 will cause rotation of the gear 80 and the main drive shaft 40 upon which it is mounted in the direction of the arrow 184 which in turn will rotate the rotor 50 fixed to said main drive shaft 40 and again winding the line about the spool 110 as above described. Again, because the gear 82 is mounted non-rotatably with respect to the shaft 40 it will be rotated in the direction of the arrow 184 and will cause rotation of the gear 200 and its shaft 194 in the opposite direction. However, because of the one-way clutch 202 the rotation of the shaft 194 will not be imparted to the gear 208 which remains substantially stationary in engagement with the gear 192 on the motor shaft 188. Thus the one-way roller clutch 202 prevents rotation of the motor when the handle 140 is being used to manually operate the line retrieval mechanism.

OTHER OPERATION

After casting, if a fish or deadhead is caught with the lure and it is desired to let the fish run with the line or to permit the line to pay out to the fish or the deadhead in order to prevent breaking of the line then in that event the fisherman either releases the motor control button or quits cranking the handle whereupon the line 101 will cause the spool 110 to rotate at a greater or lesser speed depending upon the adjustment of the drag device 114, 118, 120. The rotation of the spool 110 will cause a clicking noise as the indents 124 pass by the end 125 of the clicker spring 126. The line cannot strip from the spool 110 without rotating the same since it bears against the extended pin 60 of the rotor 50 and the rotor 50 is prevented from rotational movement in a direction opposite to the arrow 184 by the one-way roller brake 44. It will also be seen that the one-way roller brake 44 additionally prevents any of the stresses of the pulling fish or deadhead from being transmitted to the gear train and through the gear train to the motor or the handle. Accordingly, the stresses upon the gear train as well as upon the motor are greatly reduced thus increasing the life of the mechanism.

It is anticipated that in most instances the fisherman will desire to utilize the electric motor for retrieval and will resort to the crank 142 only in the event that the battery pack is exhausted and a replacement is not readily available. Accordingly, the crank 142 may be readily removed merely by pulling the same outwardly of the casing 18 and the handle then may be kept in the fisherman's pocket or tackle box for ready use when needed. It will be appreciated that this ready removability and attachment of the crank 142 is a considerable advantage since it lightens the reel when removed but is readily available for use if needed.

The location of the line brake 100 as an elastomeric doughnut adhered to the inside of the nose piece 105 also provides the advantage that there is a minimum of wear and pressure against the brake as compared with prior devices wherein the brake was placed upon the main shaft 40 at the front face of the rotor 50 since the line, when being retrieved, does not have any tendency to rub against the brake 100 to wear the line 101 and the brake 100.

We claim:

1. A fishing reel comprising a line winding mechanism, a first shaft, a gear train operable upon rotation of said shaft to rotate said line winding mechanism, a second shaft, said second shaft forming a part of a manual crank, one of said shafts having a bore therein, the other of said shafts being of a diameter to fit within said bore, interlocking means for locking said shafts together for rotation of both of said shafts upon operation of said manual crank, and friction means interposed between said bore and said other shaft for removably, frictionally retaining said other shaft within the bore of said one shaft.

2. The device of claim 1 in which said friction means is an "O" ring disposed in an annular groove in said other shaft.

3. The device of claim 1 including a battery operated motor means operably connected to said gear train for operating the line winding mechanism.

* * * * *